United States Patent

(12) United States Patent
Kasahara et al.

(10) Patent No.: US 12,326,126 B2
(45) Date of Patent: Jun. 10, 2025

US012326126B2

(54) RESONATOR STRUCTURE

(71) Applicant: SUBARU CORPORATION, Tokyo (JP)

(72) Inventors: Akihiro Kasahara, Tokyo (JP); Tatsuya Okuno, Tokyo (JP); Tetsurou Masuma, Tokyo (JP); Fengyun Gui, Tokyo (JP); Takuro Tomita, Tokyo (JP); Takamichi Hosaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 139 days.

(21) Appl. No.: 18/232,454

(22) Filed: Aug. 10, 2023

(65) Prior Publication Data

US 2024/0068430 A1 Feb. 29, 2024

(30) Foreign Application Priority Data

Aug. 29, 2022 (JP) ................................ 2022-136095

(51) Int. Cl.
*F02M 35/12* (2006.01)

(52) U.S. Cl.
CPC ................................ *F02M 35/1266* (2013.01)

(58) Field of Classification Search
CPC ............... F02M 35/12; F02M 35/1233; F02M 35/1255; F02M 35/1266; F02M 35/1216; F02M 35/1261; F02M 35/1277
See application file for complete search history.

(56) References Cited

U.S. PATENT DOCUMENTS 6,983,820 B2 * 1/2006 Boast .................. F16L 55/0335 181/243
7,934,581 B2 * 5/2011 Kim .................. F02M 35/1216 123/184.55
9,010,485 B2 * 4/2015 Bornemann ....... F02M 35/1266 123/184.57
9,057,313 B2 * 6/2015 Heeb .................. F02M 35/1266
9,175,648 B2 * 11/2015 Dobrin ............... F02M 35/1211
9,625,077 B2 * 4/2017 Barbolini .............. F16L 55/033
10,403,256 B2 * 9/2019 Denker .............. F02M 35/1266
10,794,341 B2 * 10/2020 Buck ................. F16L 55/02781
11,060,489 B2 * 7/2021 Kimura ............ F02M 35/10347
11,236,714 B2 * 2/2022 Choi .................. F02M 35/1211
11,255,303 B2 * 2/2022 Satarino ............ F16L 55/02763
2004/0194751 A1 * 10/2004 Limbrunner ..... F02M 35/10124 123/184.21
2005/0150718 A1 * 7/2005 Knight ............... F02M 35/1216 181/276

(Continued)

FOREIGN PATENT DOCUMENTS

CN 105822469 A * 8/2016
CN 107781076 A * 3/2018

(Continued)

*Primary Examiner* — Edgardo San Martin
(74) *Attorney, Agent, or Firm* — MCGINN I.P. LAW GROUP, PLLC

(57) ABSTRACT

A resonator structure includes an intake duct and a resonator that is accommodated in the intake duct. The resonator extends upward. The resonator includes a collar that protrudes toward an inner surface of the intake duct. One or both of the inner surface and the collar include a surface texture for gathering oil into a gap between the inner surface and the collar.

5 Claims, 6 Drawing Sheets

(56) References Cited

U.S. PATENT DOCUMENTS

| | | | | |
|---|---|---|---|---|
| 2013/0263823 | A1 * | 10/2013 | Denker | F02M 35/10295<br>123/434 |
| 2021/0293210 | A1 * | 9/2021 | Timme | F02M 35/1266 |
| 2022/0049672 | A1 * | 2/2022 | Metzger | F02M 35/10144 |
| 2022/0381209 | A1 * | 12/2022 | Kim | F02M 35/1272 |

FOREIGN PATENT DOCUMENTS

| | | | | |
|---|---|---|---|---|
| DE | 102018122988 | A1 * | 3/2020 | F02M 35/10321 |
| JP | 2008-82306 | A | 4/2008 | |
| WO | WO-2018090961 | A1 * | 5/2018 | |

* cited by examiner

RESONATOR STRUCTURE

CROSS-REFERENCE TO RELATED APPLICATIONS

The present application claims priority from Japanese Patent Application No. 2022-136095 filed on Aug. 29, 2022, the entire contents of which are hereby incorporated by reference.

BACKGROUND

The disclosure relates to a resonator structure.

An intake duct coupled to an engine includes a resonator for reducing noise accompanying the suction of the air. For example, Japanese Unexamined Patent Application Publication (JP-A) No. 2008-82306 discloses an intake passage and a resonator disposed in the intake passage. This resonator includes a tubular member and a collar wall protruding from the tubular member to an inner wall surface of the intake passage. A seal member is disposed between the collar wall and the inner wall surface of the intake passage. Alternatively, when the collar wall is appropriately sealed with the inner wall surface of the intake passage without the seal member, the seal member is not disposed.

SUMMARY

An aspect of the disclosure provides a resonator structure. The resonator structure includes an intake duct and a resonator that is accommodated in the intake duct. The resonator extends upward. The resonator includes a collar that protrudes toward an inner surface of the intake duct. One or both of the inner surface and the collar include a surface texture for gathering oil into a gap between the inner surface and the collar.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

A gap between the intake duct and the resonator is desired to be kept in a predetermined range from a design value for achieving intended noise reduction. However, this uses strict tolerance management and may cause a manufacturing cost increase.

It is desirable to provide a resonator structure capable of ensuring an intended noise reduction performance without strict tolerance management.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
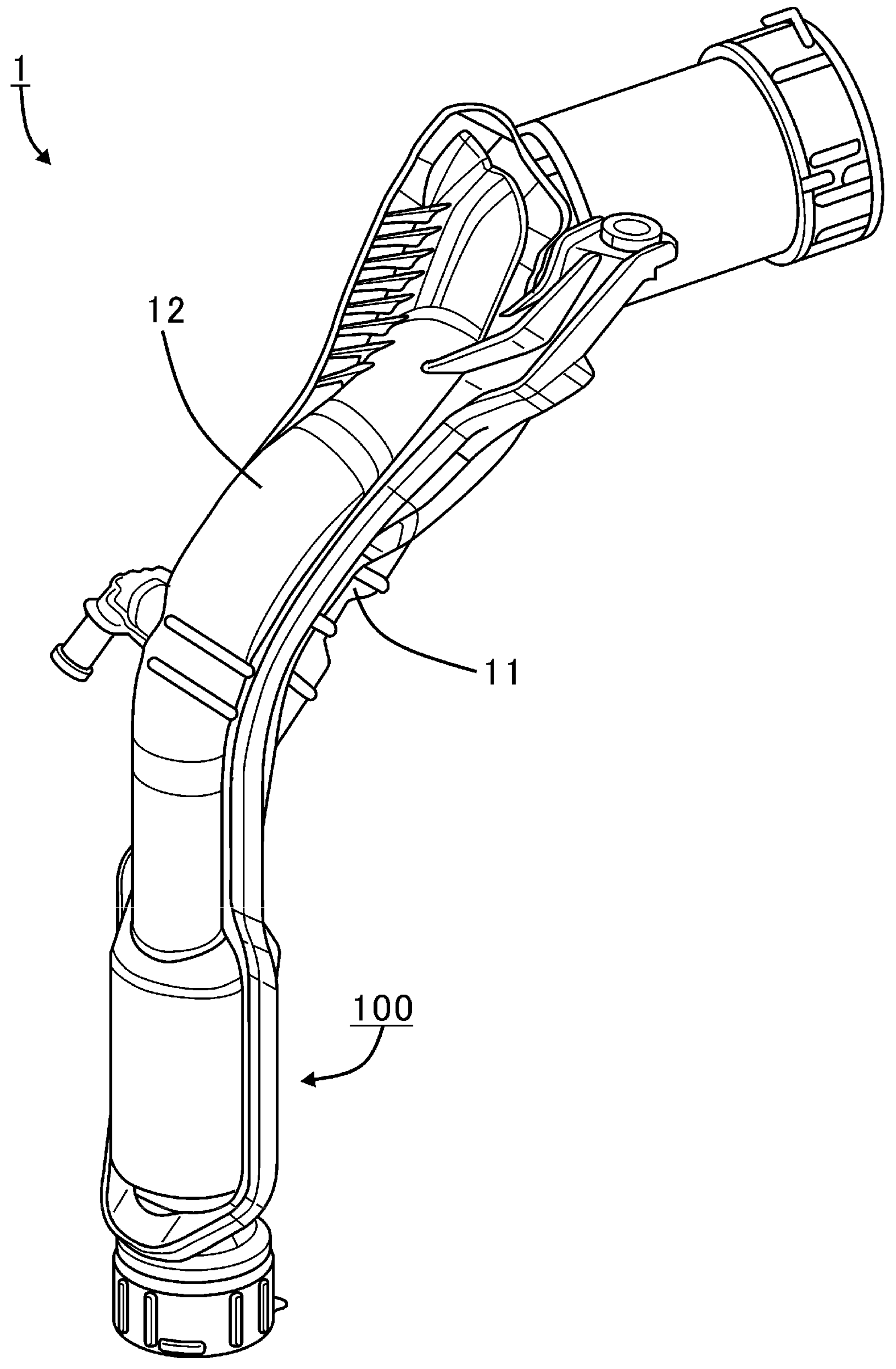
FIG. 1 is a perspective view illustrating a resonator structure according to an embodiment.
Figure 2:
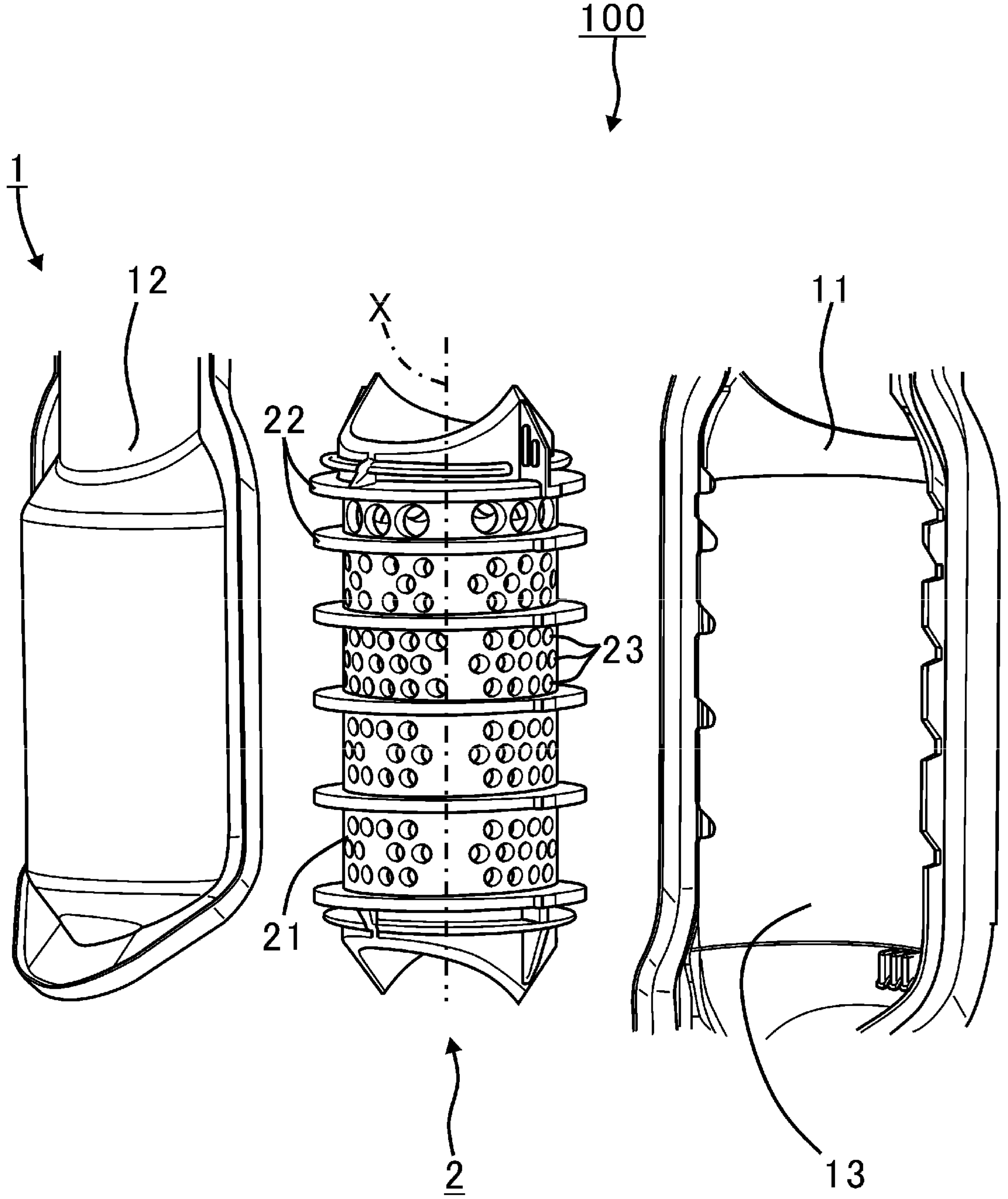
FIG. 2 is an exploded perspective view illustrating the resonator structure of FIG. 1.

FIG. 1 is a perspective view illustrating a resonator structure 100 according to an embodiment. FIG. 2 is an exploded perspective view illustrating the resonator structure 100 of FIG. 1.

Referring to FIG. 1, the resonator structure 100 is applied to an intake duct 1. The intake duct 1 is coupled to an intake port of an engine, not illustrated. In a section to which the resonator structure 100 is applied, the intake duct 1 extends upward, for example, extends in parallel to a vertical direction. The intake duct 1 is split into two parts, generally along a passage, including a lower duct 11 and an upper duct 12. The lower duct 11 and the upper duct 12 are assembled with each other.

Referring to FIG. 2, the resonator structure 100 includes the intake duct 1, which is, for example, one segment of the intake duct 1, and a resonator 2.

The resonator 2 is accommodated in the intake duct 1. In one example, the resonator 2 is disposed in a space between the lower duct 11 and the upper duct 12. The resonator 2 reduces noise produced when the air is suctioned into the intake duct 1 from outside. The resonator 2 includes a main body 21 and one or multiple collars 22. In the embodiment, the resonator 2 includes six collars 22.

The main body 21 is generally cylindrical. The main body 21 is disposed so that a central axis line X of the main body 21 extends upward, for example, extends in parallel to the vertical direction. In the disclosure, a radial direction and a circumferential direction about the central axis line X of the main body 21 (resonator 2) can be referred to simply as "radial direction" and "circumferential direction", respectively. The main body 21 includes multiple holes 23. The holes 23 penetrate the main body 21 in the radial direction.

The multiple collars 22 are disposed along the central axis line X. The collars 22 are generally annular. The collars 22 protrude radially outward from an outer surface of the main body 21 to an inner surface 13 of the intake duct 1. In the embodiment, the collars 22 protrude in parallel to a horizontal direction and may have substantially flat shapes.

Figure 3:
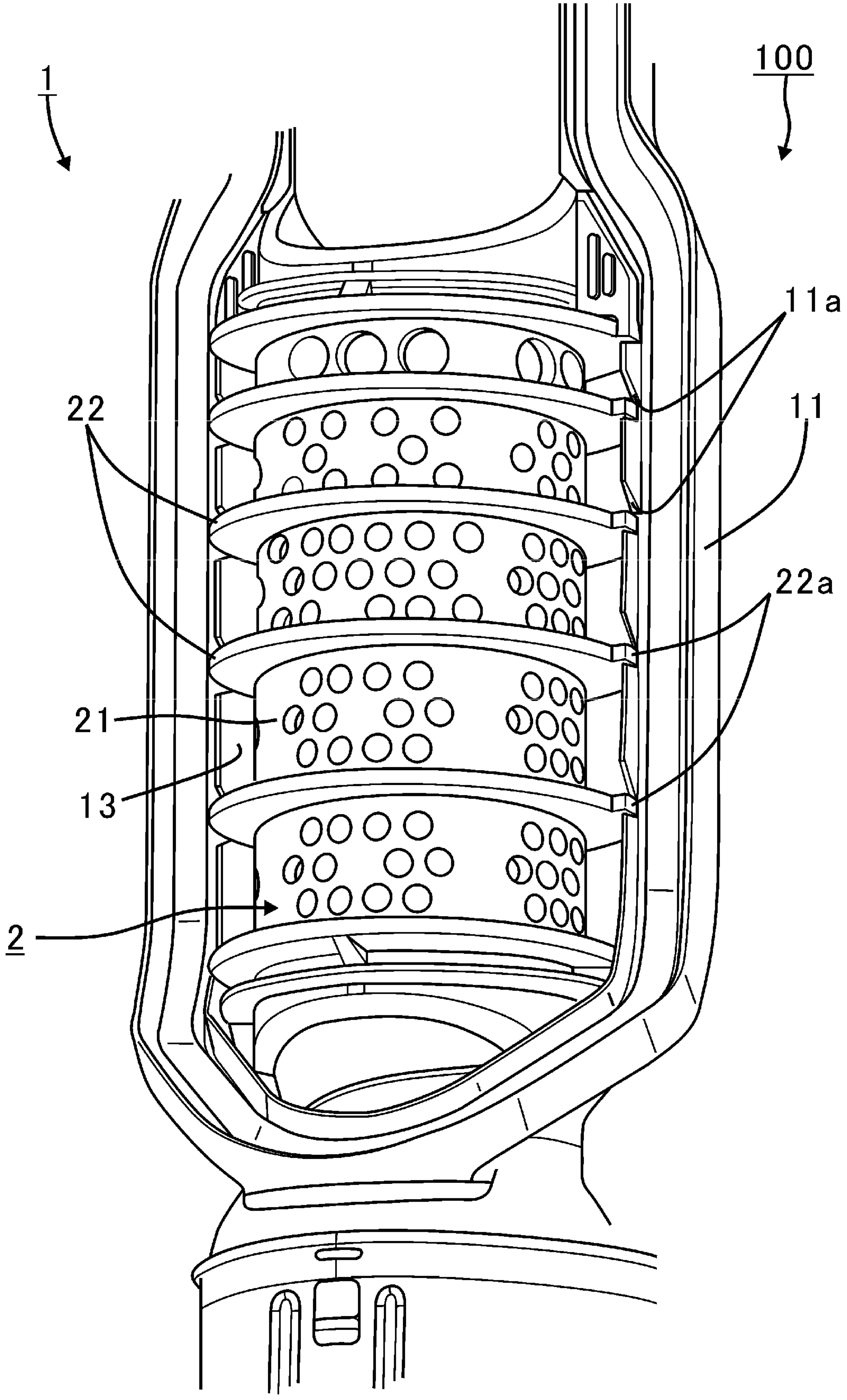
FIG. 3 is a perspective view illustrating the resonator structure of FIG. 1 from which an upper duct is detached.

FIG. 3 is a perspective view illustrating the resonator structure 100 of FIG. 1 from which the upper duct 12 is detached. Each collar 22 includes one or multiple protrusions 22*a*. The intake duct 1 includes notches 11*a* at positions corresponding to the protrusions 22*a*, respectively. Each protrusion 22*a* is inserted into the notch 11*a*. The resonator 2 is positioned in the intake duct 1 by the protrusions 22*a*. The collar 22 is apart from the inner surface 13 of the intake duct 1 at positions other than those of the protrusions 22*a*.

Figure 4:
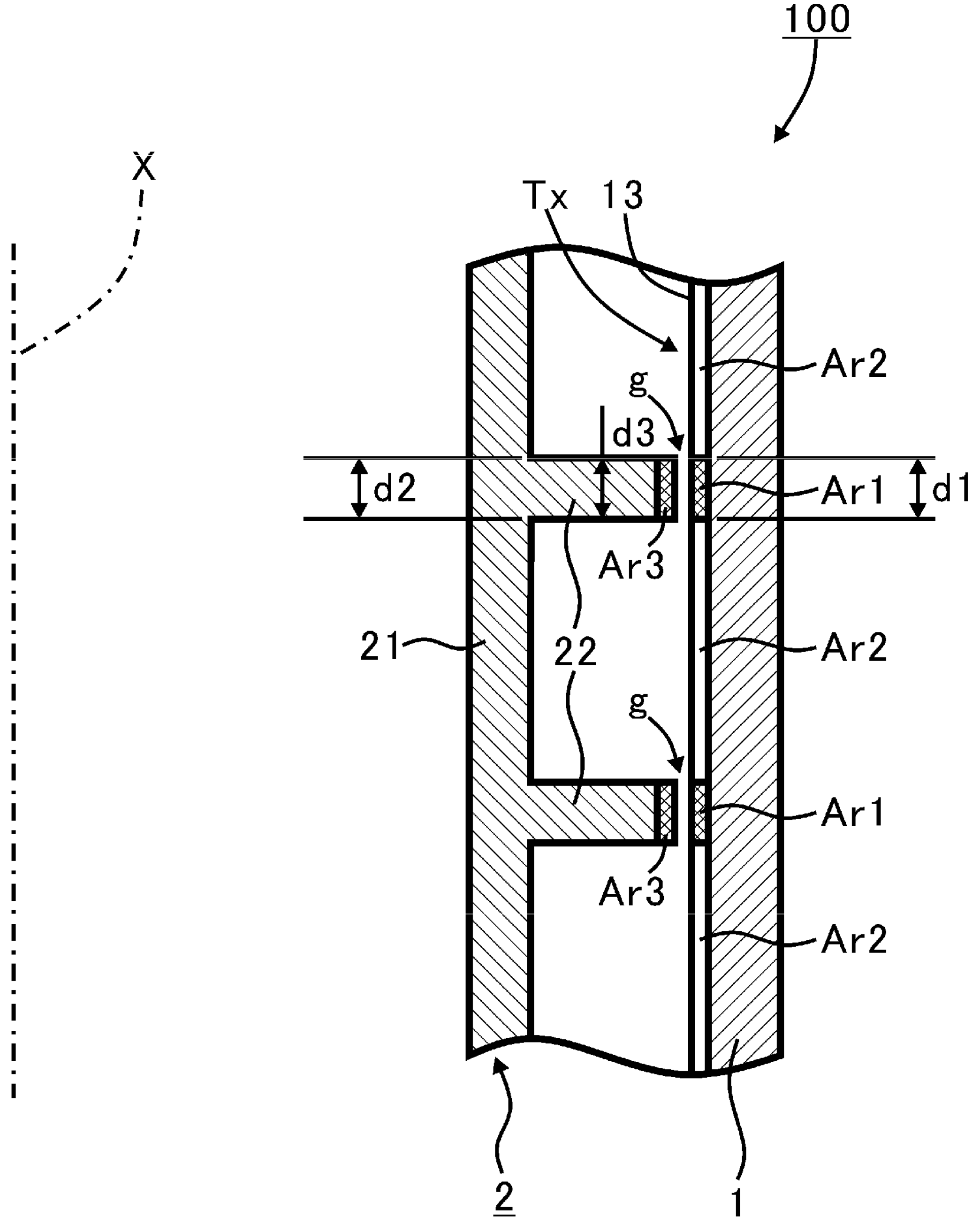
FIG. 4 is a cross-sectional view of the resonator structure of FIG. 1 obtained along a central axis line.

FIG. 4 is a cross-sectional view of the resonator structure 100 of FIG. 1 obtained along the central axis line X. For better understanding, FIG. 4 illustrates just one side of the resonator structure 100 with respect to the central axis line X and just a range including two collars 22. As described, each collar 22 is apart from the inner surface 13 of the intake duct 1 at the positions other than those of the protrusions 22*a* (not illustrated in FIG. 4). Therefore, a gap g is formed between the collar 22 and the inner surface 13.

Oil mist containing vaporized engine oil and fuel may flow backward to the intake duct 1 from an engine. In the resonator structure 100, one or more of the inner surface 13 of the intake duct 1 and the collar 22 include a surface texture Tx for gathering the oil mist into the gap g.

In the embodiment, the surface texture Tx includes a first area Ar1, a second area Ar2, and a third area Ar3. It is noted that the first area Ar1, the second area Ar2, and the third area Ar3 are exaggerated in FIG. 4 for better understanding and may be thinner than those illustrated in FIG. 4. In addition, the first area Ar1 and the third area Ar3 are illustrated cross-hatched in FIG. 4 for better understanding.

The first area Ar1 is formed at a position opposed to each collar 22 in the radial direction on the inner surface 13. For example, the first area Ar1 may be annular and continuous in the circumferential direction. Alternatively, the first area Ar1 may be intermittent in the circumferential direction as long as sufficient oil can be gathered into the gaps g, as described later.

In the embodiment, a width d1 of the first area Ar1 is equal to a thickness d2 of the collar 22 in an extension direction of the resonator 2, i.e., in the direction parallel to the central axis line X. In another embodiment, the width d1 may be smaller or larger than the thickness d2.

The second area Ar2 is formed in upper and lower areas of the first areas Ar1 on the inner surface 13. From another perspective, the second area Ar2 may be provided between the collars 22 in the direction parallel to the central axis line X. For example, the second area Ar2 may be or may not be provided in the upper area of the uppermost collar 22. Likewise, for example, the second area Ar2 may be or may not be provided in the lower area of the lowermost collar 22. For example, the second area Ar2 may be cylindrical and continuous in the circumferential direction. Alternatively, the second area Ar2 may be intermittent in the circumferential direction as long as sufficient oil can be gathered into the gaps g.

The third area Ar3 is formed at a position opposed to the first area Ar1 on each collar 22 in the radial direction, i.e., on an outer peripheral surface of the collar 22. The gap g is formed between the first area Ar1 and the third area Ar3. For example, the third area Ar3 may be annular and continuous in the circumferential direction. Alternatively, the third area Ar3 may be intermittent in the circumferential direction as long as sufficient oil can be gathered into the gap g. In the embodiment, a width d3 of the third area Ar3 is equal to the thickness d2 of the collar 22 in the vertical direction. In another embodiment, the width d3 may be smaller than the thickness d2.

It is noted that the surface texture Tx may not necessarily include the third area Ar3.

The first area Ar1 and the second area Ar2 are different from each other in one or more of an "angle of contact" and an "angle of fall" with respect to an oil drop.

For example, in the embodiment, the first area Ar1 and the second area Ar2 are different from each other in the "angle of fall" with respect to an oil drop. In one example, the angle of fall of the first area Ar1 is greater than the angle of fall of the second area Ar2.

The "angle of fall", also referred to as the "angle of slide", is an indicator that represents liquid drop removal properties of a surface of interest. For example, the "angle of fall" can be measured by the following procedures. First, a fixed amount of an oil drop are formed on the surface of interest installed horizontally. Next, the surface of interest is tilted gradually. Subsequently, the angle between the horizontal direction and the surface of interest when an oil drop starts sliding on the surface of interest is measured. The angle of fall is measured in this way. That is, oil can be held better on the surface at a greater angle of fall.

In the embodiment, the angle of fall of the first area Ar1 is greater than the angle of fall of the second area Ar2, as described above. Therefore, the first area Ar1 is capable of holding oil better than the second area Ar2. In other words, the second area Ar2 is less capable of holding oil than the first area Ar1. According to such configurations, oil mist adhering to the second area Ar2 falls downward toward the first area Ar1 below the second area Ar2. Since the first area Ar1 can hold the oil well, the oil falling from the second area Ar2 is held by the first area Ar1. The first area Ar1 is opposed to each collar 22; therefore, the oil is gathered into the gap g between the collar 22 and the inner surface 13. Therefore, the gap g is closed by the gathered oil. According to such configurations, the resonator structure 100 can be designed so that the intended noise reduction performance can be obtained in the state of closing the gap g, irrespective of a size of the gap g. Therefore, the intended noise reduction performance can be obtained without strictly managing a tolerance of the gap g.

Furthermore, in the embodiment, the third area Ar3 is similar to the first area Ar1 in the "angle of fall" with respect to an oil drop. Therefore, like the first area Ar1, the third area Ar3 can hold oil well. In this way, the first area Ar1 and the third area Ar3 opposed to each other can hold the oil well, enabling more oil to be gathered into the gap g.

For example, the first area Ar1 and the third area Ar3 having a greater angle of fall with respect to an oil drop could be surfaces having irregularities of a few μm, a several μm, or a few tens of μm. Such surfaces may be formed, for example, by surface treatment such as blasting or by coating. Alternatively, for example, surface patterns of the first area Ar1 and the third area Ar3 may be imparted to dies used for pressing the intake duct 1 and the resonator 2. For example, the angle of fall of the first area Ar1 and the third area Ar3 may be between 90 and 180 degrees.

For example, the second area Ar2 having a smaller angle of fall with respect to an oil drop could be a surface having smaller irregularities than those of the first area Ar1 and the third area Ar3. For example, the second area Ar2 could be a surface without machining for forming the first area Ar1 and the third area Ar3. For example, the second area Ar2 could be a surface after machining or pressing. For example, the angle of fall of the second area Ar2 may be between 0 and 90 degrees.

The resonator structure 100 described above includes the intake duct 1 and the resonator 2 that is accommodated in the intake duct 1 and that extends upward. The resonator 2 includes the collar 22 that protrudes toward the inner surface 13 of the intake duct 1. One or more of the inner surface 13 and the collar 22 includes the surface texture Tx for gathering oil into the gap g between the inner surface 13 and the collar 22. According to such configurations, the gap g is closed by the oil gathered by the surface texture Tx. Therefore, the resonator structure 100 can be designed so that the intended noise reduction performance can be obtained in the state of closing the gap g, irrespective of the size of the gap g. Therefore, the intended noise reduction performance can be obtained without strictly managing the tolerance of the gap g.

Furthermore, in the resonator structure 100, the surface texture Tx includes the first area Ar1 that is opposed to the collar 22 on the inner surface 13, and the second area Ar2 that is formed in the upper and lower areas of the first area Ar1 on the inner surface 13 and that is different from the first area Ar1 in the angle of fall with respect to the oil drop. In one example, the angle of fall of the first area Ar1 is greater than the angle of fall of the second area Ar2. According to such configurations, the first area Ar1 and the second area Ar2 formed on the inner surface 13 of the intake duct 1 can gather the oil adhering to the inner surface 13 into the gap g.

Furthermore, in the resonator structure 100, the width d1 of the first area Ar1 is equal to the thickness d2 of the collar 22 in the extension direction of the resonator 2. According to such configurations, the first area Ar1 is formed throughout the gap g and the gap g can be, therefore, closed sufficiently.

Moreover, in the resonator structure 100, the surface texture Tx includes the third area Ar3 that is opposed to the first area Ar1 in the collar 22 and that is similar to the first area Ar1 in the angle of fall. According to such configurations, the third area Ar3 opposed to the first area Ar1 is similar to the first area Ar1 in the angle of fall. Therefore, it is possible to gather more oil into the gap g between the first area Ar1 and the third area Ar3.

Next, another embodiment will be described.

Figure 5:
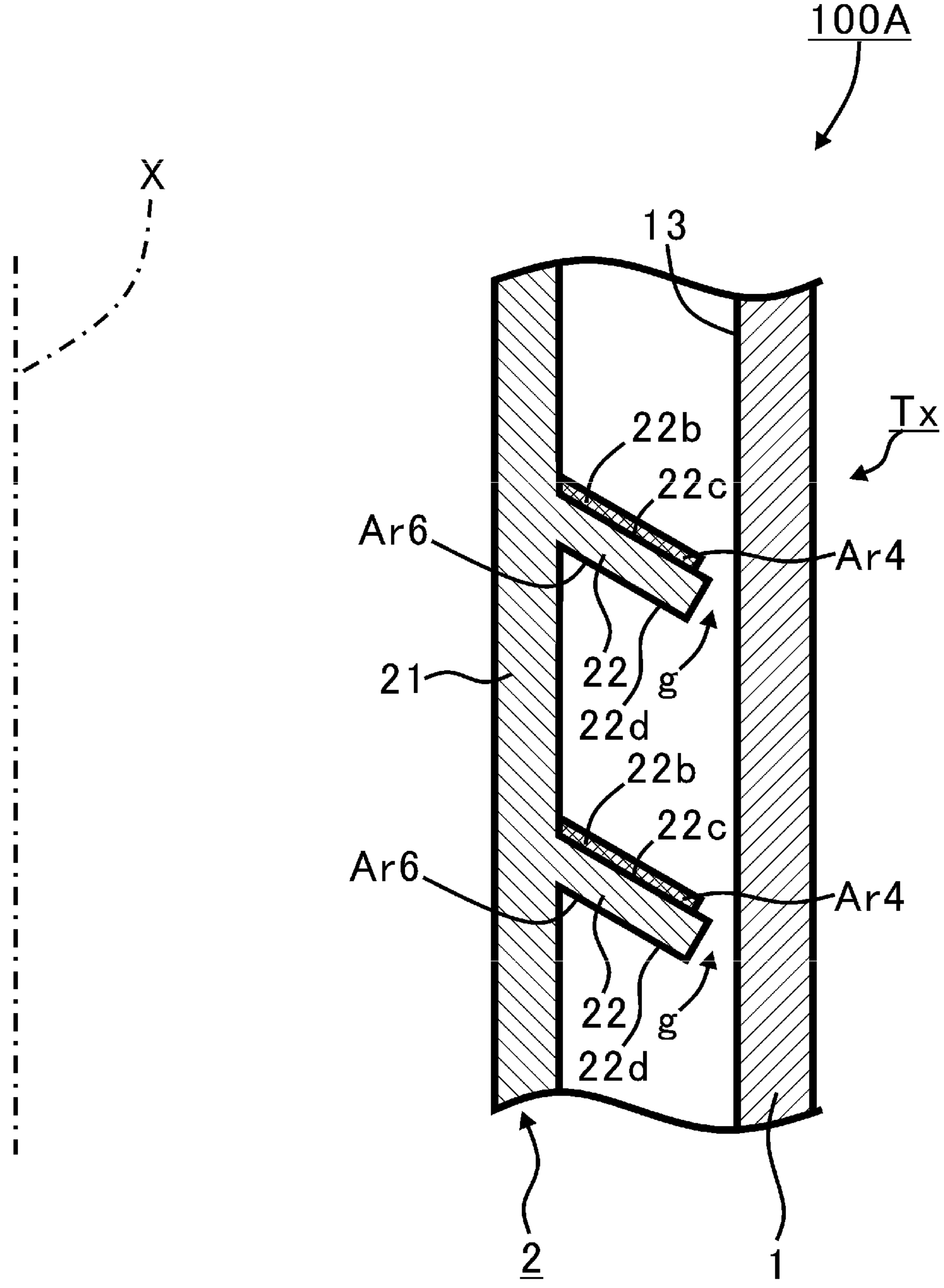
FIG. 5 is a cross-sectional view of a resonator structure obtained along a central axis line according to another embodiment.

FIG. 5 is a cross-sectional view of a resonator structure 100A obtained along the central axis line X according to the other embodiment. For better understanding, FIG. 5, like FIG. 4, illustrates just one side of the resonator structure 100A with respect to the central axis line X and just a range including the two collars 22.

The resonator structure 100A differs from the resonator structure 100 in a shape of the collar 22 and a position of the surface texture Tx. The resonator structure 100A may be the same as the resonator structure 100 in other respects.

In the embodiment, the collars 22 are tilted downward as being closer to the inner surface 13 of the intake duct 1. In addition, each collar 22 has multiple ribs 22*b* disposed radially about the central axis line X. It is noted that FIG. 5 illustrates just one rib 22*b* per collar 22. The rib 22*b* protrudes upward from an upper surface 22*c* of the collar 22. The rib 22*b* extends radially outward from a location where the collar 22 is coupled to the main body 21. The rib 22*b* is formed apart from an outer circumferential edge of the collar 22.

Figure 6:
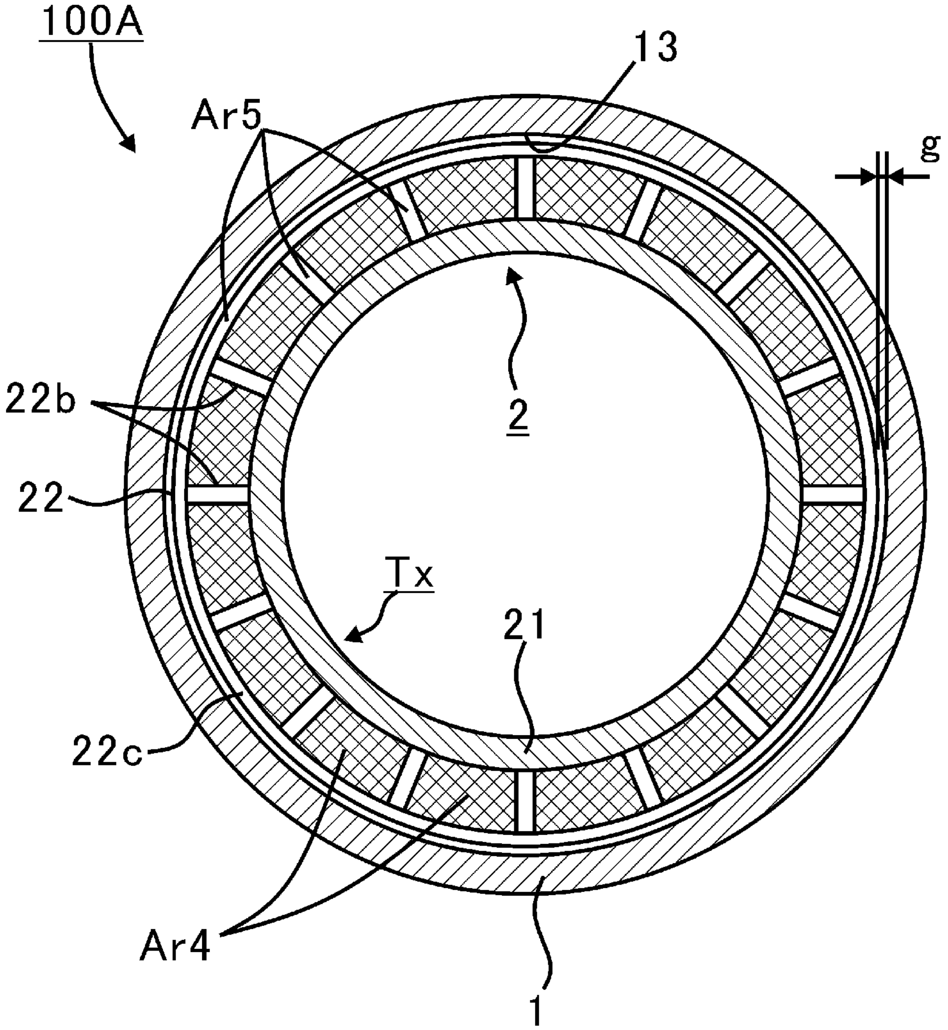
FIG. 6 is a cross-sectional view of the resonator structure of FIG. 5 perpendicular to the central axis line.

FIG. 6 is a cross-sectional view of the resonator structure 100A of FIG. 5 perpendicular to the central axis line X, with the collar 22 viewed from above. In the embodiment, the surface texture Tx includes a fourth area Ar4 and a fifth area Ar5. The fourth area Ar4 is illustrated cross-hatched in FIGS. 5 and 6 for better understanding.

The fourth area Ar4 is provided between the multiple ribs 22*b* on the upper surface 22*c* of the collar 22. That is, the fourth area Ar4 includes multiple fan members. The fourth area Ar4 is formed apart from the outer circumferential edge of the collar 22. Referring to FIG. 5, the fourth area Ar4 is also formed on side surfaces of the ribs 22*b*.

Referring to FIG. 6, the fifth area Ar5 is formed in areas other than the fourth area Ar4 on the upper surface 22*c* of each collar 22. In one example, the fifth area Ar5 is formed on an upper surface of each rib 22*b*. In addition, the fifth area Ar5 is provided in annular areas between the fourth area Ar4 and the outer circumferential edge of the collar 22 in the radial direction.

The fourth area Ar4 and the fifth area Ar5 are formed to differ in the "angle of contact" with respect to an oil drop. In one example, the angle of contact (first angle of contact) of the fourth area Ar4 is greater than the angle of contact (second angle of contact) of the fifth area Ar5. That is, the fourth area Ar4 is oleophobic and the fifth area Ar5 is oleophilic.

The "angle of contact" is an indicator representing oleophilic properties or oleophobic properties of a surface of interest. As the angle of contact is greater, the surface of interest has higher oleophobic properties and lower oleophilic properties. For example, the "angle of contact" may be measured by a method specified in standards such as JIS. For example, the "angle of contact (static angle of contact)" can be measured by the following procedures. First, a fixed amount of an oil drop are formed on the surface of interest installed horizontally. Next, the angle formed between the surface of interest and a tangent line of a lowest point on an outer surface of the oil drop with the surface of interest is measured by, for example, a measurement instrument such as a camera or a microscope. The angle of contact is measured in this way.

Referring to FIG. 5, the surface texture Tx also includes a sixth area Ar6. The sixth area Ar6 is provided on an entire lower surface 22*d* of each collar 22. The sixth area Ar6 has a third angle of contact smaller than the first angle of contact with respect to an oil drop. In the embodiment, the third angle of contact of the sixth area Ar6 is identical to the second angle of contact of the fifth area Ar5. That is, the sixth area Ar6 is oleophilic.

Referring to FIG. 6, in the resonator structure 100A, part of the oil adhering to the fifth area Ar5 on the upper surface of each rib 22*b* runs down toward the fourth area Ar4 between the ribs 22*b*. In addition, the rest of the oil adhering to the fifth area Ar5 on the upper surface of the rib 22*b* runs down toward the annular fifth area Ar5 by the gravity of the tilted collar 22. The oil adhering to the fourth area Ar4 is repelled by the oleophobic fourth area Ar4 and runs down toward the annular fifth area Ar5 by the gravity of the tilted collar 22. Therefore, the oil adhering to the upper surface 22*c* of the collar 22 is gathered into the annular fifth area Ar5 on the outer circumferential edge of the collar 22. The gap g is closed by the gathered oil. According to such configurations, the resonator structure 100A can be designed so that the intended noise reduction performance can be obtained in the state of closing the gap g. It is noted that patterns of the fourth area Ar4 and the fifth area Ar5 are not limited to those illustrated in FIGS. 5 and 6, and other patterns may be used as long as sufficient oil can be gathered into the gap g.

Furthermore, referring to FIG. 5, the sixth area Ar6 on the lower surface 22*d* of each collar 22 is oleophilic in the embodiment. Therefore, the oil adhering to the sixth area Ar6 does not fall and runs down to the outer circumferential edge of the collar 22 along the sixth area Ar6. Therefore, more oil can be gathered into the gap g.

The oleophobic fourth area Ar4 may be formed, for example, by surface treatment such as blasting or by coating. Alternatively, for example, a surface pattern of the fourth area Ar4 may be imparted to a die used for pressing the resonator 2. For example, the first angle of contact of the fourth area Ar4 may be between 150 and 180 degrees.

The oleophilic fifth area Ar5 and sixth area Ar6 could be, for example, surfaces without machining for imparting oleophobic properties. For example, the fifth area Ar5 and the sixth area Ar6 could be surfaces after machining or pressing. For example, the second angle of contact of the fifth area Ar5 and the third angle of contact of the sixth area Ar6 may be between 0 and 5 degrees.

In such a resonator structure 100A, like the resonator structure 100, the gap g is closed by the oil gathered by the surface texture Tx. Therefore, the resonator structure 100A can be designed so that the intended noise reduction performance can be obtained in the state of closing the gap g, irrespective of the size of the gap g. Therefore, the intended noise reduction performance can be obtained without strictly managing the tolerance of the gap g.

Furthermore, in the resonator structure 100A, the surface texture Tx includes the fourth area Ar4 that is formed on the upper surface 22*c* of the collar 22 and that has the first angle of contact with respect to the oil drop, and the fifth area Ar5 that is formed on the upper surface 22*c* of the collar 22 and that has the second angle of contact smaller than the first angle of contact with respect to the oil drop. According to such configurations, the fourth area Ar4 and the fifth area Ar5 formed on the upper surface 22*c* can gather the oil adhering to the upper surface 22*c* of the collar 22 into the gap g.

Moreover, in the resonator structure 100A, the surface texture Tx includes the sixth area Ar6 that is formed on the lower surface 22*d* of the collar 22 and that has the third angle of contact smaller than the first angle of contact with respect to the oil drop. According to such configurations, the sixth area Ar6 formed on the lower surface 22*d* of the collar 22 can gather the oil adhering to the lower surface 22*d* into the gap g.

Furthermore, in the resonator structure 100A, the fifth area Ar5 includes the outer circumferential edge of the upper surface 22*c* of the collar 22. According to such configurations, the oleophilic fifth area Ar5 is formed on the outer circumferential edge of the collar 22 closer to the gap g. Therefore, the oil can be held near the gap g.

In the resonator structure 100A, the collar 22 is tilted downward as being closer to the inner surface 13. Therefore, the gravity generated by tilting the collar 22 can facilitate gathering the oil into the gap g.

While the embodiments of the disclosure has been described with reference to the accompanying drawings, the disclosure is not limited to the embodiments. It is evident that a person in the art could conceive of examples of various modifications or revisions within the scope set forth in the claims. It would be understood that those modifications or revisions naturally fall in the technical range of the disclosure.

For example, referring to FIG. 4, in the resonator structure 100, the first area Ar1 and the second area Ar2 are different from each other in the "angle of fall" with respect to an oil drop. In another embodiment, the first area Ar1 and the second area Ar2 may be different from each other in the angle of contact with respect to an oil drop.

For example, the angle of contact of the first area Ar1 may be greater than the angle of contact of the second area Ar2. In other words, the first area Ar1 may be oleophobic and the second area Ar2 may be oleophilic.

In this case, oil mist adhering to the second area Ar2 runs down toward the first area Ar1 below the second area Ar2. Since the first area Ar1 is oleophobic, the oil is accumulated in the first area Ar1. Since the first area Ar1 is opposed to the collar 22, the gap g is closed by the accumulated oil.

In this case, the third area Ar3 may be similar to the first area Ar1 in the "angle of contact" with respect to an oil drop. That is, the third area Ar3, like the first area Ar1, is oleophobic. According to such configurations, the first area Ar1 and the third area Ar3 opposed to each other can accumulate the oil, enabling more oil to be gathered into the gap g.

Furthermore, in further another embodiment, the angle of contact of the first area Ar1 may be smaller than the angle of contact of the second area Ar2. In other words, the first area Ar1 may be oleophilic and the second area Ar2 may be oleophobic.

In this case, the oil gathered once into the first area Ar1 is repelled by the oleophobic second area Ar2 below the first area Ar1. Therefore, the oil is held in the first area Ar1. Since the first area Ar1 is opposed to the collar 22, the gap g is closed by the held oil.

In this case, the third area Ar3 may differ from the first area Ar1 and may be oleophobic. According to such configurations, the oil is accumulated in the oleophobic third area Ar3, ensuring sufficient oil to close the gap g between the inner surface 13 and the collar 22.

The invention claimed is:

1. A resonator structure comprising:
an intake duct; and
a resonator that is accommodated in the intake duct, the resonator extending upward, wherein
the resonator comprises a collar that protrudes toward an inner surface of the intake duct, and
one or both of the inner surface and the collar comprise a surface texture for gathering oil into a gap between the inner surface and the collar.

2. The resonator structure according to claim 1, wherein the surface texture comprises:
a first area that is opposed to the collar on the inner surface; and
a second area that is disposed in upper and lower areas of the first area on the inner surface, the second area being different from the first area in one or both of an angle of contact and an angle of fall with respect to an oil drop.

3. The resonator structure according to claim 2, wherein the angle of fall of the first area with respect to the oil drop is greater than the angle of fall of the second area with respect to the oil drop.

4. The resonator structure according to claim 2, wherein the surface texture comprises
a third area that is opposed to the first area in the collar, the third area being similar to the first area in one or both of the angle of contact and the angle of fall.

5. The resonator structure according to claim 1, wherein the surface texture comprises:
a fourth area that is disposed on an upper surface of the collar, the fourth area having a first angle of contact with respect to the oil drop; and
a fifth area that is disposed on the upper surface of the collar, the fifth area having a second angle of contact smaller than the first angle of contact with respect to the oil drop.

* * * * *